Sept. 20, 1960 W. M. SCHOLL 2,953,130
CUSHIONING SURGICAL PAD
Filed Sept. 18, 1956 2 Sheets-Sheet 1
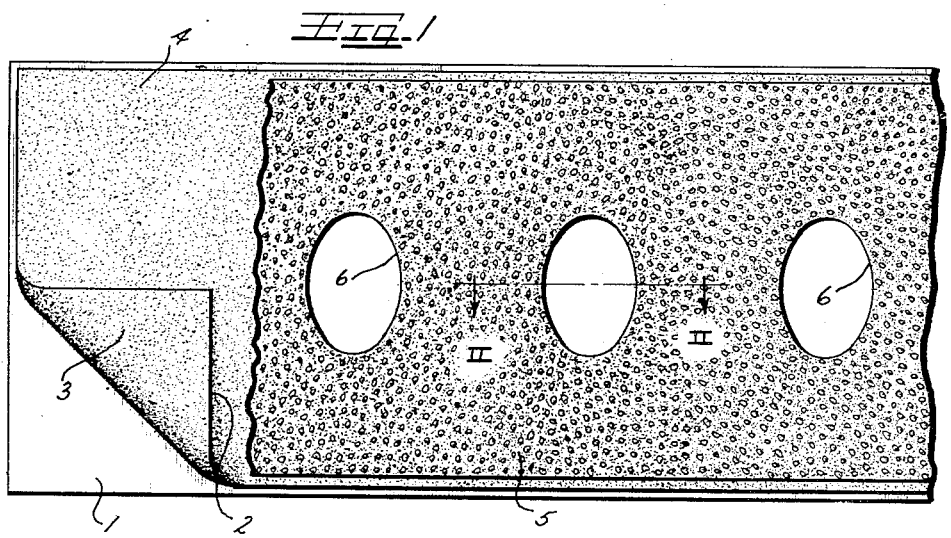
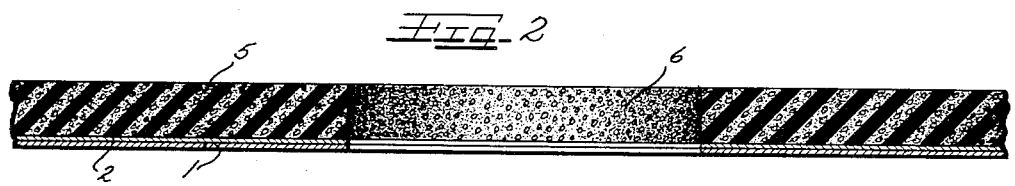
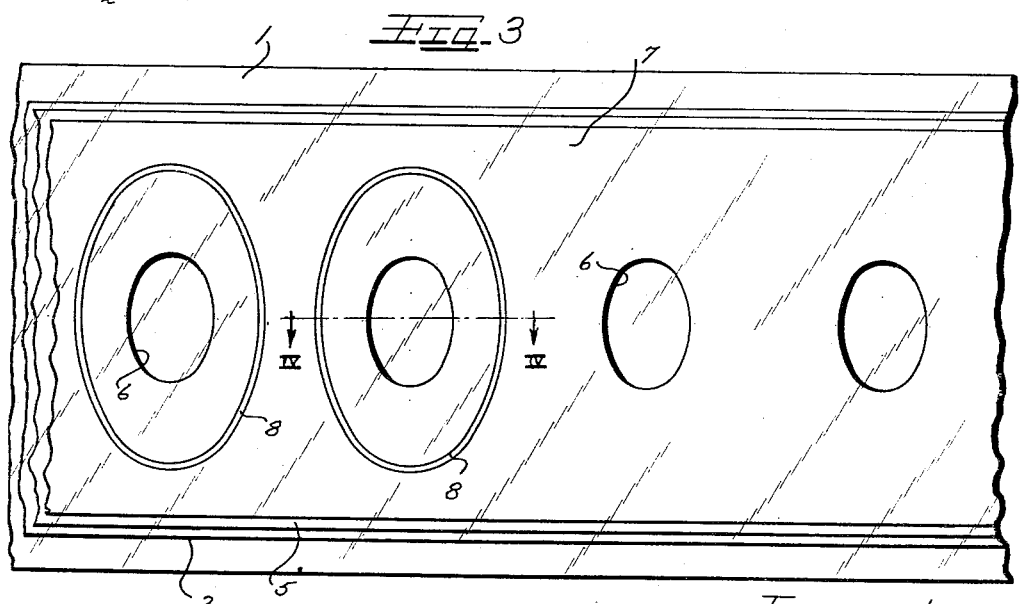
Inventor
WILLIAM M. SCHOLL Sept. 20, 1960  W. M. SCHOLL  2,953,130
CUSHIONING SURGICAL PAD
Filed Sept. 18, 1956  2 Sheets-Sheet 2

Inventor
WILLIAM M. SCHOLL
By Hill, Sherman, Meroni, Gross & Simpson
Attys

United States Patent Office 2,953,130
Patented Sept. 20, 1960

2,953,130

CUSHIONING SURGICAL PAD

William M. Scholl, 211-213 W. Schiller St., Chicago, Ill.

Filed Sept. 18, 1956, Ser. No. 610,596

9 Claims. (Cl. 128—153)

This invention relates to improvements in a cushioning surgical pad, and more particularly to a cushioning device of the type attachable to the body of a user for many and various purposes, the invention being highly desirable for the manufacture of surgical pads, bandages, and the like, and the invention may take any desired form such for example as blister and furuncle shields, corn, callous, bunion, hammer-toe pads and the like, and many other and various types of pads, bandages, dressings, etc. for the alleviation of afflictions or the prevention of irritation, as will be apparent to one skilled in the art.

Protective devices of the character of the instant invention, particularly those designed for cushioning certain areas of the body, or eliminating pressure or frictional irritation from certain areas, have been made in many styles and forms in the past. These formerly known devices, however, while in some cases possessing several desiderata, did not in any instance of which I am aware possess most or all of the desiderata in a device of this character. Briefly, these formerly known devices did not possess certain advantages, inter alia, including bending without wrinkling, elimination of abrupt edges, ability to transfer pressure gradually away from a certain area, the effective holding of medicament or exudation and maintaining the same from contacting apparel, adequate long life, presentation of a smooth outer surface over which apparel may freely glide, being inherently fungus resistant, etc. Further, in most cases, manufacture of devices of the character heretofore known required at least one hand operation, particularly in the placing of the devices upon a suitable facing or card, or otherwise mounting the same for adequate packaging for the retail trade.

With the foregoing in mind, it is an important object of the instant invention to provide a cushioning device for attachment to the human body which, in an individual device, possesses all the above mentioned advantages.

Another object of the instant invention is the provision of a cushioning device for attachment to the body of a user which device may consist of thermoplastic laminations heat sealed together at the bounding edge.

A further object of the invention resides in the provision of a cushioning device of the character set forth herein which may comprise thermoplastic laminations heat sealed at the bounding edge in such a manner that the upper lamination has a downwardly curvate margin which effectively encloses the edges of the laminations therebeneath.

While some of the more salient features, characteristics and advantages of the instant invention have been above pointed out, others will become apparent from the following disclosures, taken in conjunction with the accompanying drawings, in which:

Figure 1 is a fragmentary plan view, with parts broken away and parts shown folded back, illustrating the first steps in the process of making the instant invention;

Figure 2 is a greatly exaggerated fragmentary vertical sectional view taken substantially as indicated by the line II—II of Figure 1, looking in the direction of the arrows;

Figure 3 is a fragmentary plan view illustrating further steps in the construction of the invention;

As shown on the drawings:

Figure 4:
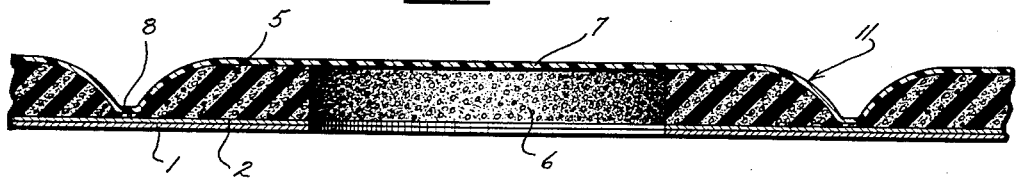
Figure 4 is a greatly enlarged fragmentary vertical sectional view taken substantially as indicated by the line IV—IV of Figure 3.

As stated above, the instant invention may be produced in substantially any size and shape desired. The same process may be followed in the manufacture of corn pads of various types and sizes, bunion pads, callous pads, and the like, vaccination and furuncle shields, various shapes of dressings or bandages for alleviating pressure from or friction by articles of apparel on afflicted or injured areas, and in the form of devices designed to hold medicament in a particular region or confine exudation from an affliction, without danger of soiling the apparel of the user. Many other and various uses will be apparent to those skilled in the art.

By way of example, and not by way of limitation, I have selected for illustrative purposes an oval shaped pad of the character that might be utilized for alleviating pressure from a callous or the like, as a vaccination or furuncle shield, as a pad for holding medicament over or confining exudation from an abrasion, open sore, or the like, and in many other ways.

For purposes of clarity, the instant invention will be described by way of its method of manufacture.

First, a sheet 1 of facing material is placed on any suitable surface such as that of a table or the like. This facing material may be a relatively tough impregnated paper having a release coating so that an article carrying a pressure sensitive adhesive surface may be readily removed therefrom without delamination of the adhesive and the article, and other satisfactory materials include parchmentized paper, a thermoplastic film, or a sheet of suitable material having a thermoplastic film or coating thereon. In the event a thermoplastic material is used, however, it is preferably a material of a character not subject to heat sealing, at least at a temperature to which the other laminations to be later described are responsive. In short, the sheet 1 may be of any suitable material capable of functioning as a temporary protective covering for a pressure sensitive adhesive surface, the facing material being removed from the adhesive surface and discarded when the device is put to use.

Upon the sheet 1 is laid a sheet or lamination 2 which is ultimately a portion of the finished article. This lamination 2 is preferably a thermoplastic film and, as seen in Figure 1, carries a pressure sensitive adhesive 3 on its under surface by which the finished device is ultimately applied to the body of the user. The sheet 2 is pressed upon the facing sheet 1, and the opposite face of the sheet 2 may be given a coating 4 of a thermoplastic cement, such as a vinyl cement.

Secured to the thermoplastic film 2 by way of the cement 4 is another lamination or sheet 5 which is preferably a thermoplastic foam. This lamination, of course, functions as the cushioning element of the complete structure and as seen clearly as in Figure 2 is preferably considerably thicker than the film or sheet 2. It will be understood that the cement 4 bonds the laminations 2 and 5 to each other in face to face relationship.

It may be mentioned at this point, that all of the sheets or laminations going to make up the device may be of the same area, although in Figures 1 and 3 of the drawings the sheets are shown of different widths for illustrative purposes only. It is preferable, however, to have the sheet 1 of facing material of slightly greater area than the laminations thereupon so as to facilitate removal of waste.

A number of thermoplastic foams and thermoplastic sheets or film material are suitable for the purpose of the instant invention, but by way of specific example and not by way of limitation, I may mention that a very satisfactory substance is vinyl foam made from a liquid composition generically known as a plastisol. The plastisol is expanded preferably by the use of an inert gas, and then cured in the expanded condition to provide a light weight structural material that is highly flexible, resilient, and possesses inter-communicating cells. The plastisol may satisfactorily be a dispersion or suspension of polyvinyl chloride resin, or a copolymer in one or more plasticizers selected from a large number of high boiling esters, for example, such as dioctyl phthalate, dioctyl adipate, dicapryl phthalate, etc.

The sheet of thermoplastic film 2 may also be vinyl film having the same chemical constituency as the foam, but made under a process devoid of expansion, being rolled on a calender or the like into a finished and considerable denser sheet. Either of the sheets may be made in substantially any desired color. Further, it should be mentioned that the foam lamination 5 has the advantages of light weight, softness, the fact that it conforms and molds to high points or contours of the body, does not mat or flatten, gives a continuous and proper balanced cushioning effect, possesses excellent resiliency, and does not press back against whatever presses upon it. This latter advantage is useful when the cushioning device is worn underneath the foot, because as distinguished from the instantaneous recovery of foam latex, the plastic foam has a lag in its recovery and does not exert back pressure, although it readily absorbs the shock of pressure of the foot. It should also be noted that the device as a whole possesses exceedingly long life, and is hygienic, effectively resisting fungus and bacteria.

After the laminations 2 and 5 are assembled upon facing sheet 1 as above described, a series of spaced apertures 6 may be punched through the entire assembly, these apertures being of a contour in keeping with the function of the particular device being made. For example, in some instances, round apertures may be preferred, and in other instances oval apertures or those of some other contour depending entirely upon the circumstances or ultimate use of the device.

Following the punching of the apertures 6, a cover sheet or lamination 7 is disposed over the foam lamination 5 as seen in Figures 3 and 4. The lamination 7 is also a thermoplastic material, and may be of the same chemical constituency as the lamination 2. However, in many instances it is desirable to have the top lamination substantially transparent and that is the way it is illustrated in the drawings. This top lamination 7 covers not only the foam lamination 5 but also extends over the apertures 6. The top lamination 7 is not secured to the foam lamination therebeneath in face-to-face relationship but is merely laid in position, and any suitable means may be utilized to maintain it in place during the heat sealing and severing of the cushioning devices.

The assembly so far described is then placed in an electronic heat sealing machine, a buffer such as a phenolic condensation product or other dielectric medium, being used if desired. Such a machine is, of course, equipped with a pair of electrodes which may be brought together in the form of a press, and at least one of these electrode dies, usually the upper, is shaped in keeping with the desired contour of the finished article.

Figure 5:
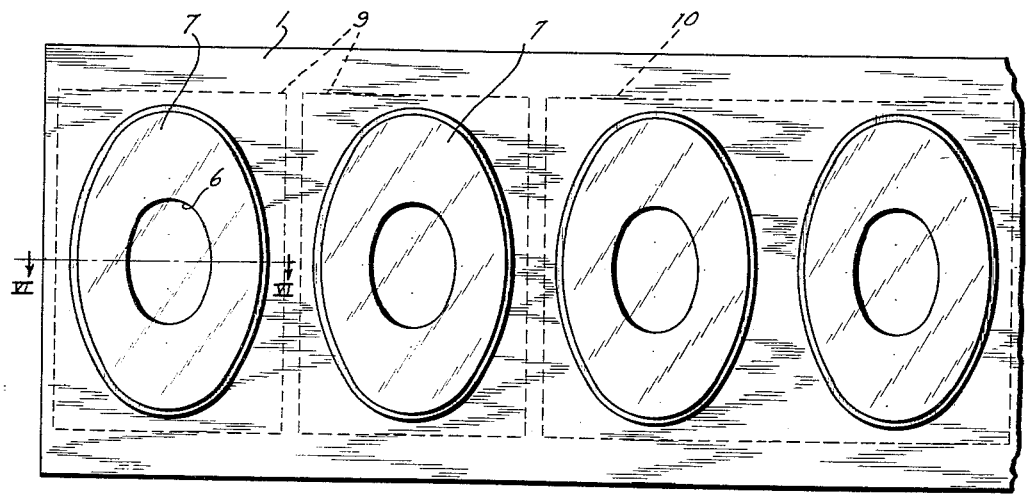
Figure 5 is a plan view illustrating the completion of performance of the method here involved.
Figure 6:
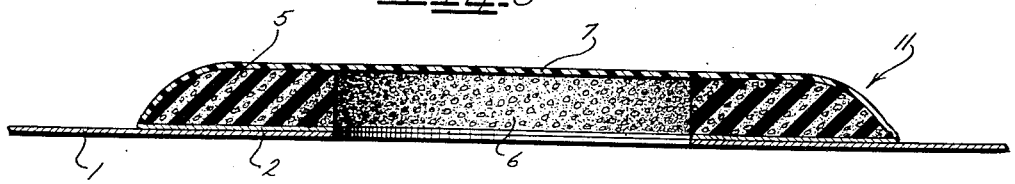
Figure 6 is a greatly enlarged transverse vertical sectional view taken substantially as indicated by the line VI—VI of Figure 5.

As the sheet is passed through the machine, the laminations 2, 5 and 7 are electronically heat sealed together, and in the illustrated instance this is accomplished along a seam indicated at 8 which defines the contour of the finished article. At the same time, the pressure is sufficient to substantially sever each article from the superposed laminations so that it is a simple expedient to withdraw the waste material leaving just the finished pads themselves remaining upon the facing sheet 1 as seen in Figures 5 and 6. The facing sheet is unaffected by the heat sealing process.

Following the removal of the waste after the heat sealing operations, the facing sheet 1 may be severed as indicated by the dotted lines 9 in Figure 5 in separate pieces, each carrying one of the finished pads. As shown, the severed pieces of facing strip are preferably of greater area than the pads, to facilitate removal of the pad from the strip at the time the pad is put to use. Likewise, the facing strip may be severed as indicated by the dotted line 10 so that two or more pads remain upon a single piece of facing sheet. With this process, there is no need for any hand operations in placing the finished devices upon a facing member for disposition in a consumer package. It is merely necessary to sever the original sheet 1 into the desired size for that purpose. That, of course, may be done mechanically and economically.

Now with reference to Figures 4 and 6 particularly, it will be seen that the finished device embodies a downwardly curvate margin therearound as indicated in general by numeral 11. This rounded margin of the appliance permits ready donning of apparel after the device has been placed on the body of the user, without any danger of the apparel catching and tending to rip the device partially loose. Further, such contouring results in a comfortable fit when the device is placed beneath a tight fitting article of apparel such as a shoe.

All abrupt edges have been eliminated and the device effectively transfers pressure away from the afflicted area which should, of course, be disposed within the cavity formed by the aperture 6.

It will further be noted that the upper thermoplastic film lamination 7 presents a smooth surface over which articles of apparel may freely glide. The top lamination 7 also curves downwardly so as to substantially completely enclose the edge of the cushion lamination 5, and merge with the lower lamination 2 although the cushion layer is caught at its edge in the heat seal. It is therefore apparent that when the device is attached to the body of a user, exudation from an affliction or medicament placed over the affliction within the aperture 6 will be effectively retained and prevented from contacting apparel. Further, where the cover or top lamination 7 is substantially transparent, the condition of the affliction may be viewed through the device without requiring its removal for that purpose.

Another distinct advantage is embodied in this invention in that the device may be applied to the body of a user is a bent or distorted condition without external wrinkling. This is due to the fact that the top lamination 7 is not connected or secured to the cushion lamination there-beneath except at the very bounding edge, namely the seam of the heat sealing operation. Thus, when the device is bent or distorted relative movement between the top lamination and the cushioning lamination is permitted.

It should be noted that under certain conditions of use it may be desirable to eliminate either the film 2 or the film 7 as the case may be. Also, it should be borne in mind that it is not necessary for the foam layer 5 to be secured to the film 2 since the heat seal will effectively bond the laminations together.

From the foregoing, it is apparent that I have provided a novel and highly efficient cushioning device for application directly to the human body. The device is long lived, may be left in useful position for an indefinite length of time, is substantially waterproof, and exceedingly comfortable to the user. When the device is made by the method hereinabove set forth, it obviously may be manufactured extremely economically. It will be understood that modifications and variations may be effected without departing from the scope of the novel concepts of the present invention.

I claim as my invention:

1. A surgical pad comprising a thermoplastic film having a pressure sensitive adhesive on its undersurface, a thermoplastic cushion layer secured to the upper surface of said film, and a top thermoplastic film laid over said cushion layer, and said films being secured together by a heat seal seam around the bounding edge of said pad with said top film in continuous abutting relation with said cushion layer and enclosing said cushion layer.

2. In a self-adhering pad and the like, a plastic film carrying pressure sensitive adhesive on its outer face, a plastic cushion layer overlying the inner face of said film, and said layer and film being connected together at the bounding edge of the pad by a heat seal seam, said cushion layer having a curvate margin terminating in a fine edge at the heat seal seam.

3. In a surgical pad and the like, a relatively thick layer of vinyl plastic cushioning material, and a vinyl plastic film overlying said layer in continuously abutting, free relationship and connected to the bounding edge thereof by a heat seal seam.

4. In a surgical pad and the like, a relatively thick layer of vinyl plastic cushioning material, and a plastic film overlying said layer in continuously abutting, free relationship and connected to the bounding edge only thereof by a heat seal seam, and pressure sensitive adhesive means carried by the outer face of said layer.

5. In a surgical pad and the like, a relatively thick layer of plastic cushioning material, and a plastic film overlying said layer in continuously abutting, free relationship and connected to the bounding edge thereof by a heat seal seam, said layer having an intermediate opening therethrough covered by said film, and said layer and said film being free from each other except for the junction at the heat seal.

6. In a cushioning device for attachment to the body of a user, a laminated structure comprising a layer of plastic cushioning material, and a sheet of plastic material overlying one side of said layer in continuously abutting, free relationship and connected thereto at the bounding edges of the layer and sheet by a heat seal seam, said layer carrying an adhesive on the opposite side thereof, and said sheet and layer being free from each other except for the heat seal.

7. In a cushioning device for attachment to the body of a user, a laminated structure comprising a relatively thick and initially flat layer of plastic cushioning material, a thin sheet of plastic material overlying one side of said layer in continuously abutting, free relationship therewith, said sheet and layer being connected together at their bounding edges by a heat seal seam with said sheet curving downwardly to enclose the relatively thick edge of said layer which is held compressed by said heat seal seam.

8. In a cushioning device for attachment to the body of a user, a laminated structure comprising a relatively thick and initially flat layer of plastic cushioning material, a thin sheet of plastic material overlying one side of said layer in continuously abutting, free relation therewith, said sheet and layer having a downwardly curvate margin therearound and being connected together at their bounding edges by a heat seal seam whereby the sheet encloses the relatively thick edge of the layer and holds the curvate margin of the layer.

9. A cushioning device for attachment to the body of a user, comprising a vinyl film carrying adhesive on one face thereof, a layer of vinyl foam overlying the other face of said film, and a top vinyl film overlying said foam layer in continuously abutting, free relationship therewith, said layer and said films being connected together at the bounding edges thereof by a heat seal seam much less in thickness than the initial thickness of the foam layer alone.

References Cited in the file of this patent

UNITED STATES PATENTS

| | | |
|---|---|---|
| 1,984,158 | Scholl | Dec. 11, 1934 |
| 1,995,077 | Perryman | Mar. 19, 1935 |
| 1,996,835 | Scholl | Apr. 9, 1935 |
| 2,033,553 | Scholl | Mar. 10, 1936 |
| 2,268,777 | Scholl | Jan. 6, 1942 |
| 2,633,127 | Scholl | Mar. 31, 1953 |
| 2,720,477 | Lancaster | Oct. 11, 1955 |
| 2,748,765 | Scholl | June 5, 1956 |
| 2,783,474 | Campagna, et al. | Mar. 5, 1957 |

FOREIGN PATENTS

| | | |
|---|---|---|
| 482,445 | Canada | Apr. 15, 1952 |